United States Patent
Centonza et al.

(10) Patent No.: US 12,452,768 B2
(45) Date of Patent: Oct. 21, 2025

(54) METHOD, APPARATUS, AND SYSTEM FOR SECURING RADIO CONNECTIONS

(71) Applicant: TELEFONAKTIEBOLAGET LM ERICSSON (PUBL), Stockholm (SE)

(72) Inventors: Angelo Centonza, Stockholm (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 320 days.

(21) Appl. No.: 17/054,643

(22) PCT Filed: May 10, 2019

(86) PCT No.: PCT/IB2019/053903
§ 371 (c)(1),
(2) Date: Nov. 11, 2020

(87) PCT Pub. No.: WO2019/215708
PCT Pub. Date: Nov. 14, 2019

(65) Prior Publication Data
US 2021/0076304 A1   Mar. 11, 2021

Related U.S. Application Data

(60) Provisional application No. 62/670,430, filed on May 11, 2018.

(51) Int. Cl.
*H04W 76/10* (2018.01)
*H04W 48/08* (2009.01)

(52) U.S. Cl.
CPC ........... *H04W 48/08* (2013.01); *H04W 76/10* (2018.02)

(58) Field of Classification Search
None
See application file for complete search history.

(56) References Cited

U.S. PATENT DOCUMENTS

2011/0136473 A1* 6/2011 Gupta ............... H04L 63/205
                                                      455/411
2015/0143463 A1* 5/2015 Baghel .............. H04W 12/02
                                                      726/3
2018/0343566 A1* 11/2018 Yu .................. H04W 12/041

FOREIGN PATENT DOCUMENTS

CN     102124766 A    7/2011
EP     1447945 B1     8/2021
(Continued)

OTHER PUBLICATIONS

Nokia, Discussion paper on LS RP-180590 on secured Signalling-onlyconnection, S3-181181, 3GPP TSG SA WG3 Security) Meeting#91, Belgrade(Serbia), Apr. 16-20, 2018. (Year: 2018).*

(Continued)

*Primary Examiner* — Pamit Kaur
(74) *Attorney, Agent, or Firm* — ERICSSON INC.

(57) ABSTRACT

A method for securing radio connections comprises performing a connection setup with a user equipment (UE); determine that security information is needed for the UE based on an event which triggers a need of the security information; send an indication to a second network node to request the security information for the UE; and receiving the security information from the network node via a UE context setup procedure. The method may avoid a waste of resource in network by determining whether the UE is required to set up a security procedure by either a network node of a radio access network or a management and function node of a core network.

25 Claims, 13 Drawing Sheets

(56) References Cited

FOREIGN PATENT DOCUMENTS

WO  WO-03037021 A1 * 5/2003 .............. H04W 8/12
WO  2017133021 A1  8/2017

OTHER PUBLICATIONS

Nokia, Discussion paper on LS RP-180590 on secured Signalling-only connection, S3-181181, 3GPP TSG SA WG3 (Security) Meeting #91, Belgrade (Serbia), Apr. 16-20, 2018.
Nokia, et al.: "AS security context Principles". SA WG2 Meeting #127. S2-184223. Apr. 16-20, 2018. Sanya, P.R. China.
ZTE: "Discussion on UE Context Setup without DRB". 3GPP TSG RAN WG3 NR#99bis. R3-181728. Sanya, China. Apr. 16-20, 2018.
Ericsson, et al., "User plane security policy", 3GPP TSG-WG2 Meeting #125, S2-1811261, Jan. 22-26, 2018, 17 Pages, Gothenburg, Sweden.

* cited by examiner

METHOD, APPARATUS, AND SYSTEM FOR SECURING RADIO CONNECTIONS

This application is a 371 of International Application No. PCT/IB2019/053903, filed May 10, 2019, which claims the benefit of U.S. Application No. 62/670,430, filed May 11, 2018, the disclosures of which are fully incorporated herein by reference.

TECHNICAL FIELD

Particular embodiments relate to the field of securing radio connections; and more specifically, to methods, apparatuses, and systems for securing radio connections by transferring security information based on specific events.

BACKGROUND

Under a current 5G System (5GS) architecture, the 5GS supports the possibility for a UE to establish a signaling-only connection with the network. For example, the property of the signaling-only connection may comprise the following: (1) information is exchanged on Signaling Radio Bearer (SRB) over the Uu interface (see TS 38.300v15.1.0); (2) the protocol is exchanged via Non-Access Stratum (NAS) layer over the N1 interface (see TS 24.501v1.1.1); and (3) the consumer of the exchanged information is the NAS entity in the UE and in a core network (CN). In that instance, the NAS entity may be 5G Mobility Management (5GMM) or 5G Session Management (5GSM). For example, the CN may be Access and Mobility Management Function (AMF) or Session Management Function (SMF).

FIG. 1 illustrates an example of non-roaming 5GS architecture in reference point representation. For example, the 5GS architecture may disclosed in TS 23.501v15.10. The usage of signaling-only connection implies that in such case no resources for user plane (UP) data transfer are established, i.e. no NG-U/N3 tunnel(s) and no DRB(s) on the Uu interface. This may occur, for example, at UE registration procedure or when UE requests a service by means of as Service Request procedure that does not require UP resources to be established.

There currently exist certain challenge(s). For example, it has been identified that there are some scenarios in which signaling-only connections need to be secured on access stratum (AS) security (see TS 38.800v15.1.0 and TS 33.501v15.0.0). The examples given are those of redirection to another radio access technology (RAT) and minimization of drive test (MDT), namely the case of reporting of logged MDT statistics by a UE, which may happen without establishment of the UP and that requires AS security. That is, the establishment of UP requires AS security. AS security is enabled by radio access network (RAN) between RAN and the user equipment (UE) on the Uu interface. Enabling AS security may use radio resource control (RRC) protocol and the Security Mode Command message (see TS 38.331v15.1.0), and also be based on the AS security information received from the AMF in the UE NG Application Protocol (NGAP) Initial UE Context Setup Request message (see TS 38.413v0.8.0). It is noted that, in both the examples mentioned above, the RAN is aware of the procedure that is about to be triggered, but the AMF may not be aware of it. On the other hand, there are cases in which the AMF is, ahead of RAN, aware of the fact that AS security information need to be signaled to the RAN due to the need of AS security establishment. Such cases are for example due to knowledge at AMF of Emergency Fallback or NAS service requests implying the setup of UP resources prior to be known in RAN.

Therefore, the events that require setting up of AS security are sometimes known by the NG-RAN only and sometimes known by the AMF ahead of RAN. In order to setup AS security, the RAN needs security information, such as security capabilities for the UE and security keys. So far, such information is provided from the CN to the RAN via the NG Context Setup procedure and NG Context Modification Procedure. However, this information may be provided by means of other procedures. For the sake of simplicity, NG Context Setup procedure is discussed below. Assuming that the security information is needed by the RAN to setup AS security, the security information is signaled from CN to RAN via the NG Context Setup procedure. It can be concluded that the AMF alone cannot decide when to trigger an NG Context Setup Request to pass security information to the NG-RAN.

The above poses a question of how can an NG: Initial Context Setup Procedure be triggered for the purpose of passing security information to the NG-RAN. One possible answer to this question may be that every time the CN needs to initiate a UE signaling connection with the NG-RAN, for a specific UE, CN issues the NG: Initial Context Setup Request message, which therefore passes the security information to the RAN. However, this practice would be inefficient and very expensive from a processing point of view, because there exist many cases in which the AMF and the NG-RAN need only to exchange one or two Non-Access Stratum (NAS) Protocol Data Units (PDUs). For such a few PDUs, it is obvious that it is not necessary to setup a full UE context via the NG: Initial Context Setup procedure, but instead it is more efficient to use the NG: Initial UE Message and NG: DL NAS Transport, which mainly transport NAS PDUs and that do not require storage of numerous UE information.

One example of such signaling-only cases is where a UE performs a Tracking Area Update (TAU), see TS 23.502v15.1.0. It would be very inefficient to require the creation of a full UE context and the establishment of AS security for a UE performing a normal TAU. This would imply storing numerous information in the UE context, which might be handled in a virtual platform and therefore not collocated with the RAN base station. In addition, running RRC Security Mode procedures may consume AS resources. Moreover, the UE will likely move to Idle shortly after the TAU, and then the UE context would need to be removed soon after being created, defeating the whole purpose of creating such UE context.

SUMMARY

To address the foregoing problems with existing solutions, disclosed are a method, a network node, and a communication system, to set up a security procedure based on certain events determined by a network node. The present disclosure implements a solution to indicate to a network node of a core network (CN) that a user equipment (UE) is required to set up a security procedure, based on a determination by a network node of a radio access network (RAN). By sending the indication to the network node of the core network, the network node of the core network may recognize a need of security information for the UE to set up a security procedure, instead of setting up a full UE context every time the CN initiates a UE signaling connection with RAN. Therefore, the communication system may set up a security procedure properly without consuming extra resources in network.

Several embodiments are elaborated in this disclosure. According to one embodiment of a method for securing radio connections, the method comprises performing a connection setup with a UE. The method further comprises determining that security information is needed for the UE based on an event which triggers a need of the security information. The method additionally comprises sending an indication to a network node to request the security information for the UE. The method yet further comprises receiving the security information from the network node via a UE context setup procedure.

In one embodiment, the method further comprises establishing a security procedure with the UE upon receiving the security information, and setting up access stratum (AS) security based on the received security information. In another embodiment, the method further comprises determining that the event which triggers the need of the security information no longer exists upon receiving the security information, and continuing the connection setup with the UE without setting up AS security.

In one embodiment, the event is a need to establish a secure connection with the UE on AS security. In another embodiment, the event is that a report of logged minimization of drive test (MDT) statistics will be requested from the UE. In yet another embodiment, the event is that a redirection of the UE to another radio access network is likely.

In one embodiment, sending the indication to the network node to request the security information for the UE comprises including an information element (IE) indicating that a UE context including the security information needs to be setup in an Initial UE message, and sending the Initial UE message to the network node.

In one embodiment, the security information is provided by the network node without the indication. In another embodiment, the security information is provided based on a determination at the network node that AS security is going to be needed for the UE. In yet another embodiment, the AS security is needed due to an emergency fallback procedure. In yet another embodiment, the AS security is needed based on a need to trigger a retrieval of UE radio capability from the UE.

In one embodiment, the network node is an Access and Mobility Management Function (AMF) node of a core network.

According to one embodiment of a network for securing radio connections, the network node comprises at least one processing circuitry, and at least one storage that stores processor-executable instructions, when executed by the processing circuitry, causes a network node to perform a connection setup with a UE. The network node further determines that security information is needed for the UE based on an event which triggers a need of the security information. The network node yet further sends an indication to a second network node to request the security information for the UE. The network node yet further receives the security information from the second network node via a UE context setup procedure.

According to one embodiment of a communication system for securing radio connections, the communication system comprises at least one network node and at least one UE. A first network node comprising at least one processing circuitry is configured to perform a connection setup with a UE; determine that security information is needed for the UE based on an event which triggers a need of the security information; and send an indication to a second network node to request the security information for the UE. The second network node is configured to receive the indication from the first network node; determine whether the security information is going to be needed for the UE; and send the security information to the first network node based on the determination via a UE context setup procedure. The first network node is further configured to receive the security information from the second network node; and establish a security procedure with the UE based on the security information.

Certain aspects of the present disclosure and their embodiments may provide solutions to these or other challenges. There are, proposed herein, various embodiments which address one or more of the issues disclosed herein.

Certain embodiments may provide one or more of the following technical advantages. The methods disclosed in the present disclosure may provide an efficient, inexpensive solution to transfer security information for the UE to establish a security procedure. In order to do that, both the RAN and CN are able to perform a determination of whether the UE is required to set up a security procedure, so that there is no resource being wasted in network. Furthermore, the network nodes in RAN and CN may all recognize the need of the security information for the UE, so that the performance of the procedures is improved.

Various other features and advantages will become obvious to one of ordinary skill in the art in light of the following detailed description and drawings. Certain embodiments may have none, some, or all of the recited advantages.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
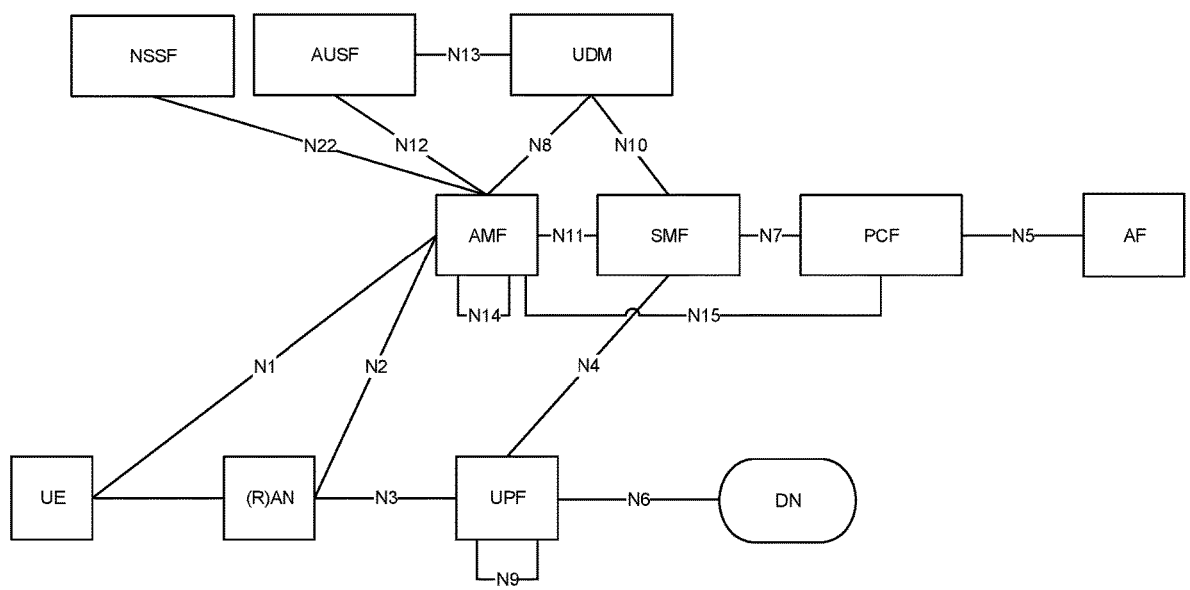
FIG. 1 illustrates an example 5G System (5GS) Architecture.

Under the current 5G system architecture, there are some issues for management modules in a core network to establish a security procedure for a user equipment with a network node in a radio access network. For example, it is unknown whether the CN or RAN should perform a determination on a need of requesting security information for the UE. Furthermore, it is resource-consuming if the CN initiates a full UE context to provide the security information for every single connection. Therefore, particular embodiments of the present disclosure help the AMF issuing an NG: Initial Context Setup Request at the right occasion, by indicating to the AMF whether the security information is needed.

For example, before sending the NG: Initial UE Message, the RAN may decide that the UE will be requested to report logged MDT statistics. This knowledge is not available at the AMF, yet such indication would require security information from the AMF. It is therefore beneficial for the RAN to indicate to the AMF in the NG: Initial UE Message that security information is needed. Accordingly, particular embodiments of the present disclosure propose that the NG RAN indicates the need for security information in the NG: Initial UE Message. In particular embodiments, the AMF receives an indication from the RAN that security information is needed, the AMF may respond with an NG: Initial Context Setup, which includes the security information. In particular embodiments the RAN does not request security information, the AMF may still trigger an NG: Initial Context Setup procedure based on certain events. For example, certain events may be an emergency fallback, or a user plane (UP) setup.

Particular embodiments of the present disclosure enable the RAN to determine whether AS security shall be established once the security information is received. Particular embodiments of the present disclosure only allow the AMF to execute the Initial UE Context Setup procedure on selected scenarios where AS security may be established, so that unnecessary creation and signaling may be avoided. Particular embodiments of the present disclosure also provide a determination on whether the security information performed in the core network. For example, the AMF receives an indication from the RAN that security information is needed, and if the AMF is aware that a UE context setup is not required, the AMF may respond the RAN with an NG: DL NAS TRANSPORT message, which will include the security information. On the other hand, the RAN may signal to the AMF that the security information without full context setup is needed, in order to trigger delivery of the security information by the AMF via a DL NAS TRANSPORT message.

There are, proposed herein, various embodiments which address one or more of the issues disclosed herein. Certain embodiments may provide one or more of the following technical advantage(s). For example, certain embodiments may allow the RAN and AMF to trigger delivery of the UE security information and to create a UE context at the RAN only in cases when this is needed. This makes the system more efficient as it avoids unnecessary creation and management of UE contexts at the RAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 2:
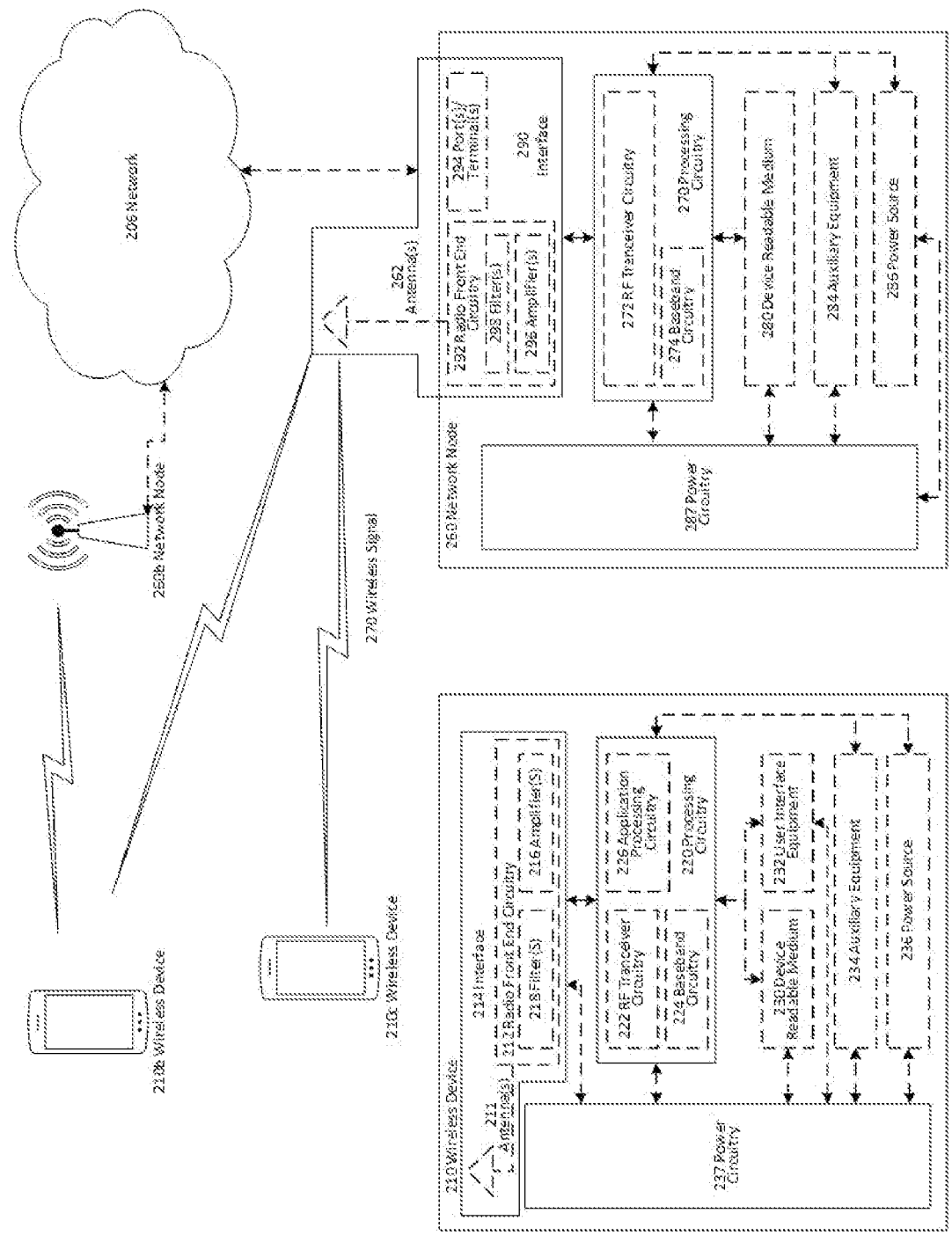
FIG. 2 illustrates an example wireless network, according to certain embodiments.

FIG. 2 is an example wireless network, in accordance with certain embodiments. Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 206, network nodes 260 and 260*b*, and wireless devices (WDs) 210, 210*b*, and 210*c*. In practice, a wireless network may further include any additional elements suitable to support communication between wireless devices or between a wireless device and another communication device, such as a landline telephone, a service provider, or any other network node or end device. Of the illustrated components, network node 260 and wireless device (WD) 210 are depicted with additional detail. In certain embodiments, the network node 260 may be a network node, which is further depicted in FIG. 13. In some embodiments, the network node 260 may be a base station, such as gNB or eNB. In the present disclosure, the term eNB may be used to refer to both an eNB and a ng-eNB, unless there is a specific need to distinguish between the two. In certain embodiments, the network node 260 may be a network node of a core network, which is further depicted in FIGS. 12 and 13. In some embodiments, the network node 260 may be an AMF node of the core network, and the core network may be 5G Core.

Figure 3:
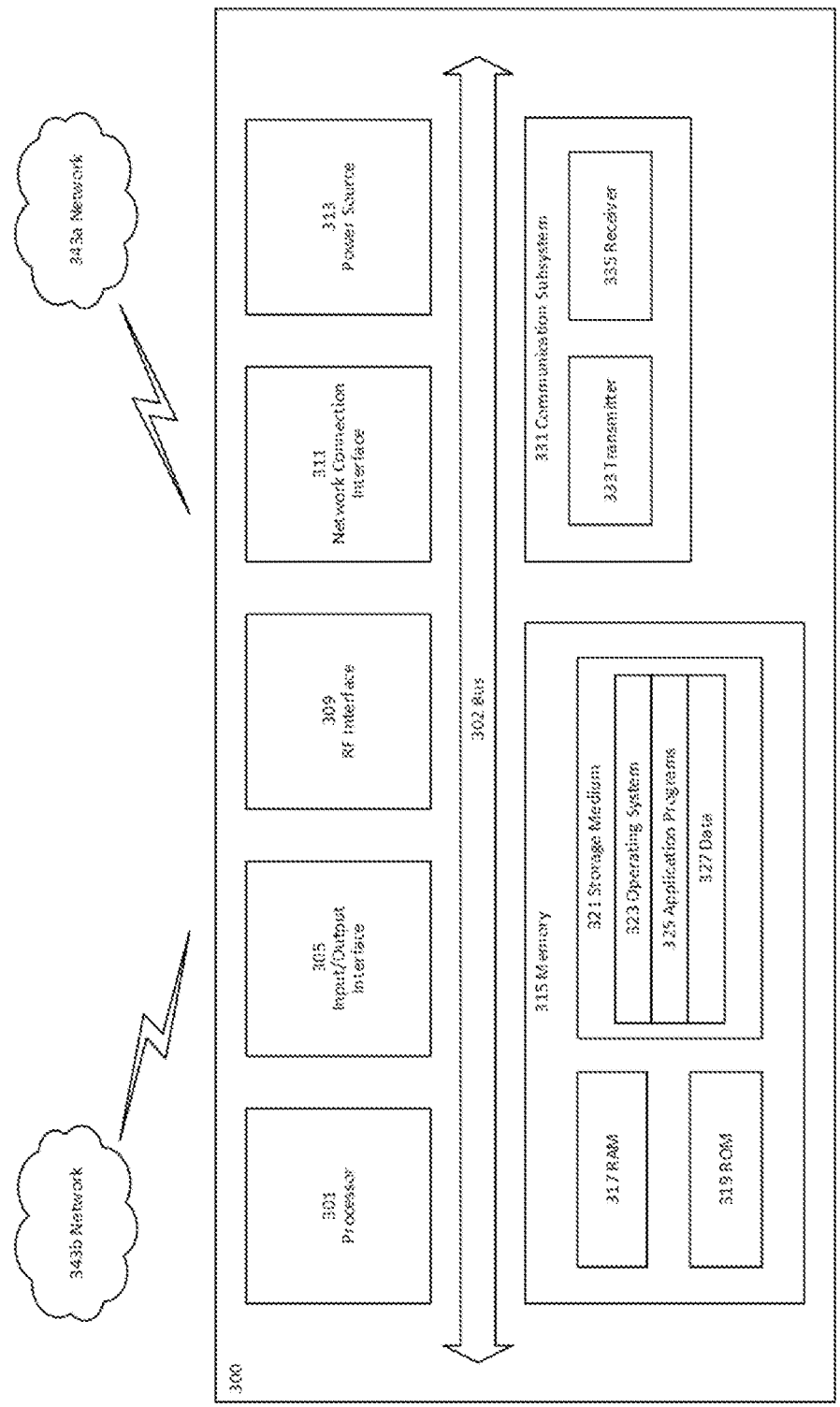
FIG. 3 illustrates an example user equipment, according to certain embodiments.

In certain embodiments, the wireless device 210 may be a user equipment, which is further illustrated in FIG. 3. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 260 and WD 210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 260 includes processing circuitry 270, device readable medium 280, interface 290, auxiliary equipment 288, power source 286, power circuitry 287, and antenna 262. Although network node 260 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 260 are depicted as single boxes located within a larger box, or nested within multiple boxes, in practice, a network node may comprise multiple different physical components that make up a single illustrated component (e.g., device readable medium 280 may comprise multiple separate hard drives as well as multiple RAM modules).

Similarly, network node 260 may be composed of multiple physically separate components (e.g., a NodeB component and a RNC component, or a BTS component and a BSC component, etc.), which may each have their own respective components. In certain scenarios in which network node 260 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 260 may be configured to support multiple radio access technologies (RATs). In such embodiments, some components may be duplicated (e.g., separate device readable medium 280 for the different RATs) and some components may be reused (e.g., the same antenna 262 may be shared by the RATs). Network node 260 may also include multiple sets of the various illustrated components for different wireless technologies integrated into network node 260, such as, for example, GSM, WCDMA, LTE, NR, WiFi, or Bluetooth wireless technologies. These wireless technologies may be integrated into the same or different chip or set of chips and other components within network node 260.

Processing circuitry 270 is configured to perform any determining, calculating, or similar operations (e.g., certain obtaining operations) described herein as being provided by a network node. These operations performed by processing circuitry 270 may include processing information obtained by processing circuitry 270 by, for example, converting the obtained information into other information, comparing the obtained information or converted information to information stored in the network node, and/or performing one or more operations based on the obtained information or converted information, and as a result of said processing making a determination. In particular embodiments, the processing circuitry 270 of the network node 260 may perform a method, which is further illustrated in FIG. 12.

Processing circuitry 270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 260 components, such as device readable medium 280, network node 260 functionality. For example, processing circuitry 270 may execute instructions stored in device readable medium 280 or in memory within processing circuitry 270. Such functionality may include providing any of the various wireless features, functions, or benefits discussed herein. In some embodiments, processing circuitry 270 may include a system on a chip (SOC).

In some embodiments, processing circuitry 270 may include one or more of radio frequency (RF) transceiver circuitry 272 and baseband processing circuitry 274. In some embodiments, radio frequency (RF) transceiver circuitry 272 and baseband processing circuitry 274 may be on separate chips (or sets of chips), boards, or units, such as radio units and digital units. In alternative embodiments, part or all of RF transceiver circuitry 272 and baseband processing circuitry 274 may be on the same chip or set of chips, boards, or units In certain embodiments, some or all of the functionality described herein as being provided by a network node, base station, eNB or other such network device may be performed by processing circuitry 270 executing instructions stored on device readable medium 280 or memory within processing circuitry 270. In alternative embodiments, some or all of the functionality may be provided by processing circuitry 270 without executing instructions stored on a separate or discrete device readable medium, such as in a hard-wired manner. In any of those embodiments, whether executing instructions stored on a device readable storage medium or not, processing circuitry 270 can be configured to perform the described functionality. The benefits provided by such functionality are not limited to processing circuitry 270 alone or to other components of network node 260, but are enjoyed by network node 260 as a whole, and/or by end users and the wireless network generally.

Device readable medium 280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 270. Device readable medium 280 may store any suitable instructions, data or information, including a computer program, software, an application including one or more of logic, rules, code, tables, etc. and/or other instructions capable of being executed by processing circuitry 270 and, utilized by network node 260. Device readable medium 280 may be used to store any calculations made by processing circuitry 270 and/or any data received via interface 290. In some embodiments, processing circuitry 270 and device readable medium 280 may be considered to be integrated.

Interface 290 is used in the wired or wireless communication of signaling and/or data between network node 260, network 206, and/or WDs 210. As illustrated, interface 290 comprises port(s)/terminal(s) 294 to send and receive data, for example to and from network 206 over a wired connection. Interface 290 also includes radio front end circuitry 292 that may be coupled to, or in certain embodiments a part of, antenna 262. Radio front end circuitry 292 comprises filters 298 and amplifiers 296. Radio front end circuitry 292 may be connected to antenna 262 and processing circuitry 270. Radio front end circuitry may be configured to condition signals communicated between antenna 262 and processing circuitry 270. Radio front end circuitry 292 may receive digital data that is to be sent out to other network nodes or WDs via a wireless connection. Radio front end circuitry 292 may convert the digital data into a radio signal having the appropriate channel and bandwidth parameters using a combination of filters 298 and/or amplifiers 296. The radio signal may then be transmitted via antenna 262. Similarly, when receiving data, antenna 262 may collect radio signals which are then converted into digital data by radio front end circuitry 292. The digital data may be passed to processing circuitry 270. In other embodiments, the interface may comprise different components and/or different combinations of components.

In certain alternative embodiments, network node 260 may not include separate radio front end circuitry 292, instead, processing circuitry 270 may comprise radio front end circuitry and may be connected to antenna 262 without separate radio front end circuitry 292. Similarly, in some embodiments, all or some of RF transceiver circuitry 272 may be considered a part of interface 290. In still other embodiments, interface 290 may include one or more ports or terminals 294, radio front end circuitry 292, and RF transceiver circuitry 272, as part of a radio unit (not shown), and interface 290 may communicate with baseband processing circuitry 274, which is part of a digital unit (not shown).

Antenna 262 may include one or more antennas, or antenna arrays, configured to send and/or receive wireless signals. Antenna 262 may be coupled to radio front end circuitry 290 and may be any type of antenna capable of transmitting and receiving data and/or signals wirelessly. In some embodiments, antenna 262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 262 may be separate from network node 260 and may be connectable to network node 260 through an interface or port.

Antenna 262, interface 290, and/or processing circuitry 270 may be configured to perform any receiving operations and/or certain obtaining operations described herein as being performed by a network node. Any information, data and/or signals may be received from a wireless device, another network node and/or any other network equipment. Similarly, antenna 262, interface 290, and/or processing circuitry 270 may be configured to perform any transmitting operations described herein as being performed by a network node. Any information, data and/or signals may be transmitted to a wireless device, another network node and/or any other network equipment.

Power circuitry 287 may comprise, or be coupled to, power management circuitry and is configured to supply the components of network node 260 with power for performing the functionality described herein. Power circuitry 287 may receive power from power source 286. Power source 286 and/or power circuitry 287 may be configured to provide power to the various components of network node 260 in a form suitable for the respective components (e.g., at a voltage and current level needed for each respective component). Power source 286 may either be included in, or external to, power circuitry 287 and/or network node 260. For example, network node 260 may be connectable to an external power source (e.g., an electricity outlet) via an input circuitry or interface such as an electrical cable, whereby the external power source supplies power to power circuitry 287. As a further example, power source 286 may comprise a source of power in the form of a battery or battery pack which is connected to, or integrated in, power circuitry 287. The battery may provide backup power should the external power source fail. Other types of power sources, such as photovoltaic devices, may also be used.

Alternative embodiments of network node 260 may include additional components beyond those shown in FIG. 2 that may be responsible for providing certain aspects of the network node's functionality, including any of the functionality described herein and/or any functionality necessary to support the subject matter described herein. For example, network node 260 may include user interface equipment to allow input of information into network node 260 and to allow output of information from network node 260. This may allow a user to perform diagnostic, maintenance, repair, and other administrative functions for network node 260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). In certain embodiments, the wireless device 210 may be a user equipment which is further depicted in FIG. 3. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 210 includes antenna 211, interface 214, processing circuitry 220, device readable medium 230, user interface equipment 232, auxiliary equipment 234, power source 236 and power circuitry 237. WD 210 may include multiple sets of one or more of the illustrated components for different wireless technologies supported by WD 210, such as, for example, GSM, WCDMA, LTE, NR, WiFi, WiMAX, or Bluetooth wireless technologies, just to mention a few. These wireless technologies may be integrated into the same or different chips or set of chips as other components within WD 210.

Antenna 211 may include one or more antennas or antenna arrays, configured to send and/or receive wireless signals, and is connected to interface 214. In certain alternative embodiments, antenna 211 may be separate from WD 210 and be connectable to WD 210 through an interface or port. Antenna 211, interface 214, and/or processing circuitry 220 may be configured to perform any receiving or transmitting operations described herein as being performed by a WD. Any information, data and/or signals may be received from a network node and/or another WD. In some embodiments, radio front end circuitry and/or antenna 211 may be considered an interface.

As illustrated, interface 214 comprises radio front end circuitry 212 and antenna 211. Radio front end circuitry 212 comprise one or more filters 218 and amplifiers 216. Radio front end circuitry 214 is connected to antenna 211 and processing circuitry 220, and is configured to condition signals communicated between antenna 211 and processing circuitry 220. Radio front end circuitry 212 may be coupled to or a part of antenna 211. In some embodiments, WD 210 may not include separate radio front end circuitry 212; rather, processing circuitry 220 may comprise radio front end circuitry and may be connected to antenna 211. Similarly, in some embodiments, some or all of RF transceiver circuitry 222 may be considered a part of interface 214. Radio front end circuitry 212 may receive digital data that is to be sent out to other network nodes or WDs via a wireless connection. Radio front end circuitry 212 may convert the digital data into a radio signal having the appropriate channel and bandwidth parameters using a combination of filters 218 and/or amplifiers 216. The radio signal may then be transmitted via antenna 211. Similarly, when receiving data, antenna 211 may collect radio signals which are then converted into digital data by radio front end circuitry 212. The digital data may be passed to processing circuitry 220. In other embodiments, the interface may comprise different components and/or different combinations of components.

Processing circuitry 220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 210 components, such as device readable medium 230, WD 210 functionality. Such functionality may include providing any of the various wireless features or benefits discussed herein. For example, processing circuitry 220 may execute instructions stored in device readable medium 230 or in memory within processing circuitry 220 to provide the functionality disclosed herein.

As illustrated, processing circuitry 220 includes one or more of RF transceiver circuitry 222, baseband processing circuitry 224, and application processing circuitry 226. In other embodiments, the processing circuitry may comprise different components and/or different combinations of components. In certain embodiments processing circuitry 220 of WD 210 may comprise a SOC. In some embodiments, RF transceiver circuitry 222, baseband processing circuitry 224, and application processing circuitry 226 may be on separate chips or sets of chips. In alternative embodiments, part or all of baseband processing circuitry 224 and application processing circuitry 226 may be combined into one chip or set of chips, and RF transceiver circuitry 222 may be on a separate chip or set of chips. In still alternative embodiments, part or all of RF transceiver circuitry 222 and baseband processing circuitry 224 may be on the same chip or set of chips, and application processing circuitry 226 may be on a separate chip or set of chips. In yet other alternative embodiments, part or all of RF transceiver circuitry 222, baseband processing circuitry 224, and application processing circuitry 226 may be combined in the same chip or set of chips. In some embodiments, RF transceiver circuitry 222 may be a part of interface 214. RF transceiver circuitry 222 may condition RF signals for processing circuitry 220.

In certain embodiments, some or all of the functionalities described herein as being performed by a WD may be provided by processing circuitry 220 executing instructions stored on device readable medium 230, which in certain embodiments may be a computer-readable storage medium. In alternative embodiments, some or all of the functionality may be provided by processing circuitry 220 without executing instructions stored on a separate or discrete device readable storage medium, such as in a hard-wired manner. In any of those particular embodiments, whether executing instructions stored on a device readable storage medium or not, processing circuitry 220 can be configured to perform the described functionality. The benefits provided by such functionality are not limited to processing circuitry 220 alone or to other components of WD 210, but are enjoyed by WD 210 as a whole, and/or by end users and the wireless network generally.

Processing circuitry 220 may be configured to perform any determining, calculating, or similar operations (e.g., certain obtaining operations) described herein as being performed by a WD. These operations, as performed by processing circuitry 220, may include processing information obtained by processing circuitry 220 by, for example, converting the obtained information into other information, comparing the obtained information or converted information to information stored by WD 210, and/or performing one or more operations based on the obtained information or converted information, and as a result of said processing making a determination.

Device readable medium 230 may be operable to store a computer program, software, an application including one or more of logic, rules, code, tables, etc. and/or other instructions capable of being executed by processing circuitry 220. Device readable medium 230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 220. In some embodiments, processing circuitry 220 and device readable medium 230 may be considered to be integrated.

User interface equipment 232 may provide components that allow for a human user to interact with WD 210. Such interaction may be of many forms, such as visual, audial, tactile, etc. User interface equipment 232 may be operable to produce output to the user and to allow the user to provide input to WD 210. The type of interaction may vary depending on the type of user interface equipment 232 installed in WD 210. For example, if WD 210 is a smart phone, the interaction may be via a touch screen; if WD 210 is a smart meter, the interaction may be through a screen that provides usage (e.g., the number of gallons used) or a speaker that provides an audible alert (e.g., if smoke is detected). User interface equipment 232 may include input interfaces, devices and circuits, and output interfaces, devices and circuits. User interface equipment 232 is configured to allow input of information into WD 210, and is connected to processing circuitry 220 to allow processing circuitry 220 to process the input information. User interface equipment 232 may include, for example, a microphone, a proximity or other sensor, keys/buttons, a touch display, one or more cameras, a USB port, or other input circuitry. User interface equipment 232 is also configured to allow output of information from WD 210, and to allow processing circuitry 220 to output information from WD 210. User interface equipment 232 may include, for example, a speaker, a display, vibrating circuitry, a USB port, a headphone interface, or other output circuitry. Using one or more input and output interfaces, devices, and circuits, of user interface equipment 232, WD 210 may communicate with end users and/or the wireless network, and allow them to benefit from the functionality described herein.

Auxiliary equipment 234 is operable to provide more specific functionality which may not be generally performed by WDs. This may comprise specialized sensors for doing measurements for various purposes, interfaces for additional types of communication such as wired communications etc. The inclusion and type of components of auxiliary equipment 234 may vary depending on the embodiment and/or scenario.

Power source 236 may, in some embodiments, be in the form of a battery or battery pack. Other types of power sources, such as an external power source (e.g., an electricity outlet), photovoltaic devices or power cells, may also be used. WD 210 may further comprise power circuitry 237 for delivering power from power source 236 to the various parts of WD 210 which need power from power source 236 to carry out any functionality described or indicated herein. Power circuitry 237 may in certain embodiments comprise power management circuitry. Power circuitry 237 may additionally or alternatively be operable to receive power from an external power source; in which case WD 210 may be connectable to the external power source (such as an electricity outlet) via input circuitry or an interface such as an electrical power cable. Power circuitry 237 may also in certain embodiments be operable to deliver power from an external power source to power source 236. This may be, for example, for the charging of power source 236. Power circuitry 237 may perform any formatting, converting, or other modification to the power from power source 236 to make the power suitable for the respective components of WD 210 to which power is supplied.

FIG. 3 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 300 may be any UE identified by the 3rd Generation Partnership Project (3GPP), including a NB-IoT UE, a MTC UE, and/or an enhanced MTC (eMTC) UE. UE 300, as illustrated in FIG. 3, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeably. Accordingly, although FIG. 3 is a UE, the components discussed herein are equally applicable to a WD, and vice-versa.

In FIG. 3, UE 300 includes processing circuitry 301 that is operatively coupled to input/output interface 305, radio frequency (RF) interface 309, network connection interface 311, memory 315 including random access memory (RAM) 317, read-only memory (ROM) 319, and storage medium 321 or the like, communication subsystem 331, power source 333, and/or any other component, or any combination thereof. Storage medium 321 includes operating system 323, application program 325, and data 327. In other embodiments, storage medium 321 may include other similar types of information. Certain UEs may utilize all of the components shown in FIG. 3, or only a subset of the components. The level of integration between the components may vary from one UE to another UE. Further, certain UEs may contain multiple instances of a component, such as multiple processors, memories, transceivers, transmitters, receivers, etc.

In FIG. 3, processing circuitry 301 may be configured to process computer instructions and data. Processing circuitry 301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 301 may include two central processing units (CPUs). Data may be information in a form suitable for use by a computer.

In the depicted embodiment, input/output interface 305 may be configured to provide a communication interface to an input device, output device, or input and output device. UE 300 may be configured to use an output device via input/output interface 305. An output device may use the same type of interface port as an input device. For example, a USB port may be used to provide input to and output from UE 300. The output device may be a speaker, a sound card, a video card, a display, a monitor, a printer, an actuator, an emitter, a smartcard, another output device, or any combination thereof. UE 300 may be configured to use an input device via input/output interface 305 to allow a user to capture information into UE 300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 3, RF interface 309 may be configured to provide a communication interface to RF components such as a transmitter, a receiver, and an antenna. Network connection interface 311 may be configured to provide a communication interface to network 343a. Network 343a may encompass wired and/or wireless networks such as a local-area network (LAN), a wide-area network (WAN), a computer network, a wireless network, a telecommunications network, another like network or any combination thereof. For example, network 343a may comprise a Wi-Fi network. Network connection interface 311 may be configured to include a receiver and a transmitter interface used to communicate with one or more other devices over a communication network according to one or more communication protocols, such as Ethernet, TCP/IP, SONET, ATM, or the like. Network connection interface 311 may implement receiver and transmitter functionality appropriate to the communication network links (e.g., optical, electrical, and the like). The transmitter and receiver functions may share circuit components, software or firmware, or alternatively may be implemented separately.

RAM 317 may be configured to interface via bus 302 to processing circuitry 301 to provide storage or caching of data or computer instructions during the execution of software programs such as the operating system, application programs, and device drivers. ROM 319 may be configured to provide computer instructions or data to processing circuitry 301. For example, ROM 319 may be configured to store invariant low-level system code or data for basic system functions such as basic input and output (I/O), startup, or reception of keystrokes from a keyboard that are stored in a non-volatile memory. Storage medium 321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 321 may be configured to include operating system 323, application program 325 such as a web browser application, a widget or gadget engine or another application, and data file 327. Storage medium 321 may store, for use by UE 300, any of a variety of various operating systems or combinations of operating systems.

Storage medium 321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 321 may allow UE 300 to access computer-executable instructions, application programs or the like, stored on transitory or non-transitory memory media, to off-load data, or to upload data. An article of manufacture, such as one utilizing a communication system may be tangibly embodied in storage medium 321, which may comprise a device readable medium.

In FIG. 3, processing circuitry 301 may be configured to communicate with network 343b using communication subsystem 331. Network 343a and network 343b may be the same network or networks or different network or networks. Communication subsystem 331 may be configured to include one or more transceivers used to communicate with network 343b. For example, communication subsystem 331 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 333 and/or receiver 335 to implement transmitter or receiver functionality, respectively, appropriate to the RAN links (e.g., frequency allocations and the like). Further, transmitter 333 and receiver 335 of each transceiver may share circuit components, software or firmware, or alternatively may be implemented separately.

In the illustrated embodiment, the communication functions of communication subsystem 331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 331 may include cellular communication, Wi-Fi communication, Bluetooth communication, and GPS communication. Network 343b may encompass wired and/or wireless networks such as a local-area network (LAN), a wide-area network (WAN), a computer network, a wireless network, a telecommunications network, another like network or any combination thereof. For example, network 343b may be a cellular network, a Wi-Fi network, and/or a near-field network. Power source 313 may be configured to provide alternating current (AC) or direct current (DC) power to components of UE 300.

The features, benefits and/or functions described herein may be implemented in one of the components of UE 300 or partitioned across multiple components of UE 300. Further, the features, benefits, and/or functions described herein may be implemented in any combination of hardware, software or firmware. In one example, communication subsystem 331 may be configured to include any of the components described herein. Further, processing circuitry 301 may be configured to communicate with any of such components over bus 302. In another example, any of such components may be represented by program instructions stored in memory that when executed by processing circuitry 301 perform the corresponding functions described herein. In another example, the functionality of any of such components may be partitioned between processing circuitry 301 and communication subsystem 331. In another example, the non-computationally intensive functions of any of such components may be implemented in software or firmware and the computationally intensive functions may be implemented in hardware.

Figure 4:
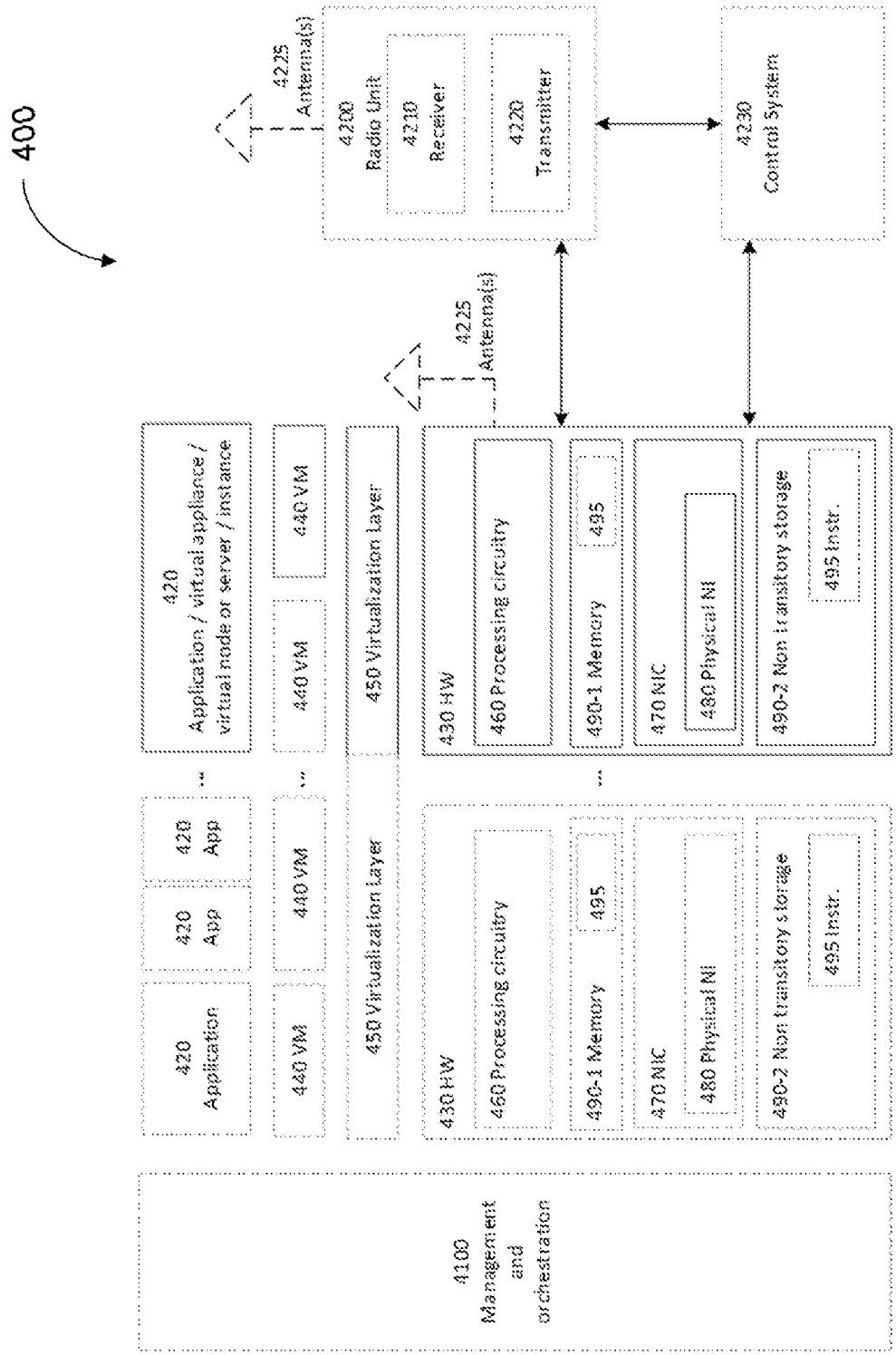
FIG. 4 illustrates an example virtualization environment, according to certain embodiments.

FIG. 4 illustrates an example virtualization environment, according to certain embodiments. FIG. 4 is a schematic block diagram illustrating a virtualization environment 400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 400 hosted by one or more of hardware nodes 430. Further, in embodiments in which the virtual node is not a radio access node or does not require radio connectivity (e.g., a core network node), then the network node may be entirely virtualized.

The functions may be implemented by one or more applications 420 (which may alternatively be called software instances, virtual appliances, network functions, virtual nodes, virtual network functions, etc.) operative to implement some of the features, functions, and/or benefits of some of the embodiments disclosed herein. Applications 420 are run in virtualization environment 400 which provides hardware 430 comprising processing circuitry 460 and memory 490. Memory 490 contains instructions 495 executable by processing circuitry 460 whereby application 420 is operative to provide one or more of the features, benefits, and/or functions disclosed herein.

Virtualization environment 400, comprises general-purpose or special-purpose network hardware devices 430 comprising a set of one or more processors or processing circuitry 460, which may be commercial off-the-shelf (COTS) processors, dedicated Application Specific Integrated Circuits (ASICs), or any other type of processing circuitry including digital or analog hardware components or special purpose processors. Each hardware device may comprise memory 490-1 which may be non-persistent memory for temporarily storing instructions 495 or software executed by processing circuitry 460. Each hardware device may comprise one or more network interface controllers (NICs) 470, also known as network interface cards, which include physical network interface 480. Each hardware device may also include non-transitory, persistent, machine-readable storage media 490-2 having stored therein software 495 and/or instructions executable by processing circuitry 460. Software 495 may include any type of software including software for instantiating one or more virtualization layers 450 (also referred to as hypervisors), software to execute virtual machines 440 as well as software allowing it to execute functions, features and/or benefits described in relation with some embodiments described herein.

Virtual machines 440, comprise virtual processing, virtual memory, virtual networking or interface and virtual storage, and may be run by a corresponding virtualization layer 450 or hypervisor. Different embodiments of the instance of virtual appliance 420 may be implemented on one or more of virtual machines 440, and the implementations may be made in different ways.

During operation, processing circuitry 460 executes software 495 to instantiate the hypervisor or virtualization layer 450, which may sometimes be referred to as a virtual machine monitor (VMM). Virtualization layer 450 may present a virtual operating platform that appears like networking hardware to virtual machine 440.

As shown in FIG. 4, hardware 430 may be a standalone network node with generic or specific components. Hardware 430 may comprise antenna 4225 and may implement some functions via virtualization. Alternatively, hardware 430 may be part of a larger cluster of hardware (e.g. such as in a data center or customer premise equipment (CPE)) where many hardware nodes work together and are managed via management and orchestration (MANO) 4100, which, among others, oversees lifecycle management of applications 420.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 440 may be a software implementation of a physical machine that runs programs as if they were executing on a physical, non-virtualized machine. Each of virtual machines 440, and that part of hardware 430 that executes that virtual machine, be it hardware dedicated to that virtual machine and/or hardware shared by that virtual machine with others of the virtual machines 440, forms a separate virtual network elements (VNE).

Still in the context of NFV, Virtual Network Function (VNF) is responsible for handling specific network functions that run in one or more virtual machines 440 on top of hardware networking infrastructure 430 and corresponds to application 420 in FIG. 4.

In some embodiments, one or more radio units 4200 that each include one or more transmitters 4220 and one or more receivers 4210 may be coupled to one or more antennas 4225. Radio units 4200 may communicate directly with hardware nodes 430 via one or more appropriate network interfaces and may be used in combination with the virtual components to provide a virtual node with radio capabilities, such as a radio access node or a base station.

In some embodiments, some signaling can be affected with the use of control system 4230 which may alternatively be used for communication between the hardware nodes 430 and radio units 4200.

Figure 5:
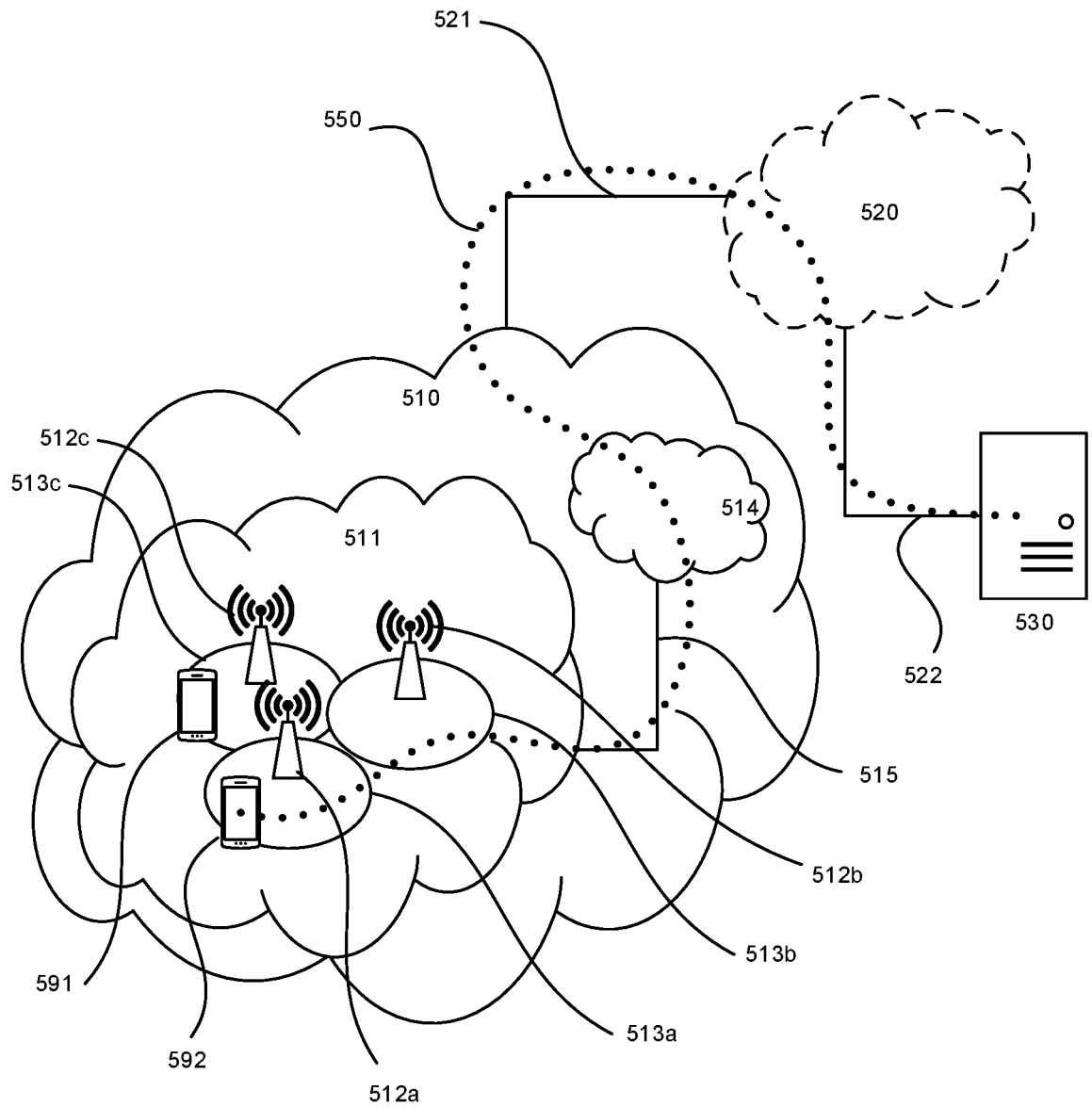
FIG. 5 illustrates an example telecommunication network connected via an intermediate network to a host computer, according to certain embodiments.

FIG. 5 illustrates an example telecommunication network connected via an intermediate network to a host computer, according to certain embodiments. With reference to FIG. 5, in accordance with an embodiment, a communication system includes telecommunication network 510, such as a 3GPP-type cellular network, which comprises access network 511, such as a radio access network, and core network 514, such as 5G Core. Access network 511 comprises a plurality of base stations 512a, 512b, 512c, such as NBs, eNBs, gNBs or other types of wireless access points, each defining a corresponding coverage area 513a, 513b, 513c. Each base station 512a, 512b, 512c is connectable to core network 514 over a wired or wireless connection 515. In certain embodiments, the plurality of base stations 512a, 512b, 512c may be connectable to an AMF node in the core network 514 as described with respect to FIGS. 2, 12, and 13. In certain embodiments, the plurality of base stations 512a, 512b, 512c may be the network node as described with respect to FIGS. 2 and 13. A first UE 591 located in coverage area 513c is configured to wirelessly connect to, or be paged by, the corresponding base station 512c. A second UE 592 in coverage area 513a is wirelessly connectable to the corresponding base station 512a. While a plurality of UEs 591, 592 are illustrated in this example, the disclosed embodiments are equally applicable to a situation where a sole UE is in the coverage area or where a sole UE is connecting to the corresponding base station 512.

Telecommunication network 510 is itself connected to host computer 530, which may be embodied in the hardware and/or software of a standalone server, a cloud-implemented server, a distributed server or as processing resources in a server farm. Host computer 530 may be under the ownership or control of a service provider, or may be operated by the service provider or on behalf of the service provider. Connections 521 and 522 between telecommunication network 510 and host computer 530 may extend directly from core network 514 to host computer 530 or may go via an optional intermediate network 520. Intermediate network 520 may be one of, or a combination of more than one of, a public, private or hosted network; intermediate network 520, if any, may be a backbone network or the Internet; in particular, intermediate network 520 may comprise two or more subnetworks (not shown).

The communication system of FIG. 5 as a whole enables connectivity between the connected UEs 591, 592 and host computer 530. The connectivity may be described as an over-the-top (OTT) connection 550. Host computer 530 and the connected UEs 591, 592 are configured to communicate data and/or signaling via OTT connection 550, using access network 511, core network 514, any intermediate network 520 and possible further infrastructure (not shown) as intermediaries. OTT connection 550 may be transparent in the sense that the participating communication devices through which OTT connection 550 passes are unaware of routing of uplink and downlink communications. For example, base station 512 may not or need not be informed about the past routing of an incoming downlink communication with data originating from host computer 530 to be forwarded (e.g., handed over) to a connected UE 591. Similarly, base station 512 need not be aware of the future routing of an outgoing uplink communication originating from the UE 591 towards the host computer 530.

Figure 6:
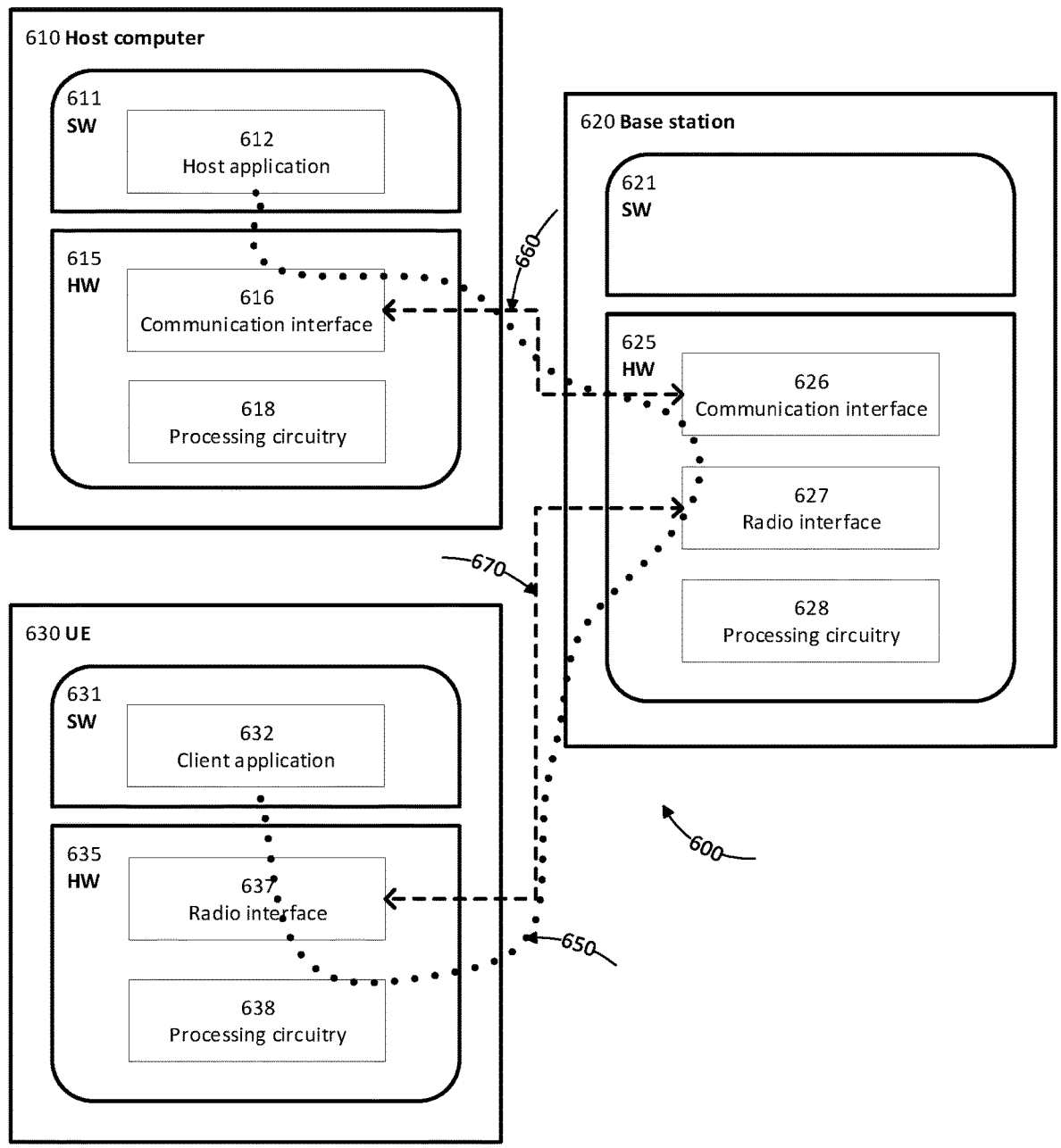
FIG. 6 illustrates an example host computer communicating via a base station with a user equipment over a partially wireless connection, according to certain embodiments.

FIG. 6 illustrates an example host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 6. In communication system 600, host computer 610 comprises hardware 615 including communication interface 616 configured to set up and maintain a wired or wireless connection with an interface of a different communication device of communication system 600. Host computer 610 further comprises processing circuitry 618, which may have storage and/or processing capabilities. In particular, processing circuitry 618 may comprise one or more programmable processors, application-specific integrated circuits, field programmable gate arrays or combinations of these (not shown) adapted to execute instructions. Host computer 610 further comprises software 611, which is stored in or accessible by host computer 610 and executable by processing circuitry 618. Software 611 includes host application 612. Host application 612 may be operable to provide a service to a remote user, such as UE 630 connecting via OTT connection 650 terminating at UE 630 and host computer 610. In providing the service to the remote user, host application 612 may provide user data which is transmitted using OTT connection 650.

Communication system 600 further includes base station 620 provided in a telecommunication system and comprising hardware 625 enabling it to communicate with host computer 610 and with UE 630. In certain embodiments, the base station 620 may be a network node as described with respect to FIG. 13. Hardware 625 may include communication interface 626 for setting up and maintaining a wired or wireless connection with an interface of a different communication device of communication system 600, as well as radio interface 627 for setting up and maintaining at least wireless connection 670 with UE 630 located in a coverage area (not shown in FIG. 6) served by base station 620. Communication interface 626 may be configured to facilitate connection 660 to host computer 610. Connection 660 may be direct or it may pass through a core network (not shown in FIG. 6) of the telecommunication system and/or through one or more intermediate networks outside the telecommunication system. In the embodiment shown, hardware 625 of base station 620 further includes processing circuitry 628, which may comprise one or more programmable processors, application-specific integrated circuits, field programmable gate arrays or combinations of these (not shown) adapted to execute instructions. Base station 620 further has software 621 stored internally or accessible via an external connection.

Communication system 600 further includes UE 630 already referred to. Its hardware 635 may include radio interface 637 configured to set up and maintain wireless connection 670 with a base station serving a coverage area in which UE 630 is currently located. Hardware 635 of UE 630 further includes processing circuitry 638, which may comprise one or more programmable processors, application-specific integrated circuits, field programmable gate arrays or combinations of these (not shown) adapted to execute instructions. UE 630 further comprises software 631, which is stored in or accessible by UE 630 and executable by processing circuitry 638. Software 631 includes client application 632. Client application 632 may be operable to provide a service to a human or non-human user via UE 630, with the support of host computer 610. In host computer 610, an executing host application 612 may communicate with the executing client application 632 via OTT connection 650 terminating at UE 630 and host computer 610. In providing the service to the user, client application 632 may receive request data from host application 612 and provide user data in response to the request data. OTT connection 650 may transfer both the request data and the user data. Client application 632 may interact with the user to generate the user data that it provides.

It is noted that host computer 610, base station 620 and UE 630 illustrated in FIG. 6 may be similar or identical to host computer 530, one of base stations 512*a*, 512*b*, 512*c* and one of UEs 591, 592 of FIG. 5, respectively. This is to say, the inner workings of these entities may be as shown in FIG. 6 and independently, the surrounding network topology may be that of FIG. 5.

In FIG. 6, OTT connection 650 has been drawn abstractly to illustrate the communication between host computer 610 and UE 630 via base station 620, without explicit reference to any intermediary devices and the precise routing of messages via these devices. Network infrastructure may determine the routing, which it may be configured to hide from UE 630 or from the service provider operating host computer 610, or both. While OTT connection 650 is active, the network infrastructure may further take decisions by which it dynamically changes the routing (e.g., on the basis of load balancing consideration or reconfiguration of the network).

Wireless connection 670 between UE 630 and base station 620 is in accordance with the teachings of the embodiments described throughout this disclosure. One or more of the various embodiments improve the performance of OTT services provided to UE 630 using OTT connection 650, in which wireless connection 670 forms the last segment. More precisely, the teachings of these embodiments may improve the handling of redundant data in the transmit buffer and thereby provide benefits such as improved efficiency in radio resource use (e.g., not transmitting redundant data) as well as reduced delay in receiving new data (e.g., by removing redundant data in the buffer, new data can be transmitted sooner).

A measurement procedure may be provided for the purpose of monitoring data rate, latency and other factors on which the one or more embodiments improve. There may further be an optional network functionality for reconfiguring OTT connection 650 between host computer 610 and UE 630, in response to variations in the measurement results. The measurement procedure and/or the network functionality for reconfiguring OTT connection 650 may be implemented in software 611 and hardware 615 of host computer 610 or in software 631 and hardware 635 of UE 630, or both. In embodiments, sensors (not shown) may be deployed in or in association with communication devices through which OTT connection 650 passes; the sensors may participate in the measurement procedure by supplying values of the monitored quantities exemplified above, or supplying values of other physical quantities from which software 611, 631 may compute or estimate the monitored quantities. The reconfiguring of OTT connection 650 may include message format, retransmission settings, preferred routing etc.; the reconfiguring need not affect base station 620, and it may be unknown or imperceptible to base station 620. Such procedures and functionalities may be known and practiced in the art. In certain embodiments, measurements may involve proprietary UE signaling facilitating host computer 610's measurements of throughput, propagation times, latency and the like. The measurements may be implemented in that software 611 and 631 causes messages to be transmitted, in particular empty or 'dummy' messages, using OTT connection 650 while it monitors propagation times, errors etc.

Figure 7:
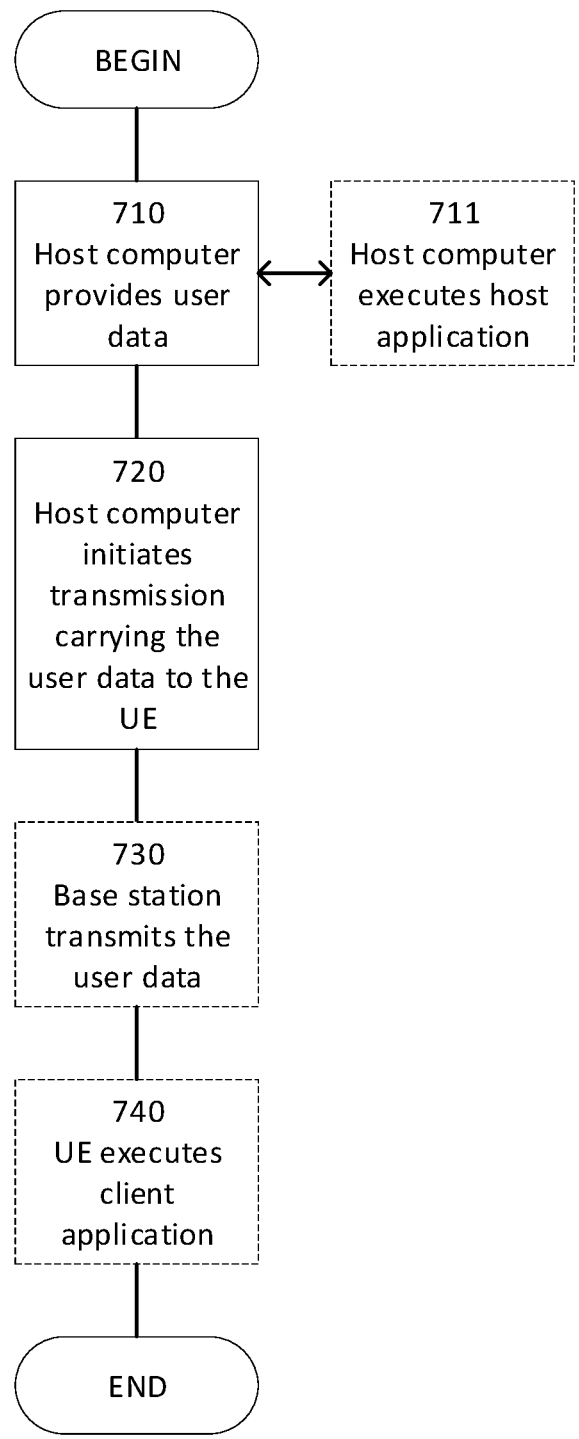
FIG. 7 illustrates an example method implemented in a communication system including a host computer, a base station and a user equipment, according to certain embodiments.

FIG. 7 illustrates an example method implemented in a communication system including a host computer, a base station and a user equipment, according to certain embodiments in accordance with some embodiments. More specifically, FIG. 7 is a flowchart illustrating a method implemented in a communication system, in accordance with one embodiment. The communication system includes a host computer, a base station which may be a network node described with reference to FIG. 13, and a UE. For simplicity of the present disclosure, only drawing references to FIG. 7 will be included in this section. In step 710, the host computer provides user data. In substep 711 (which may be optional) of step 710, the host computer provides the user data by executing a host application. In step 720, the host computer initiates a transmission carrying the user data to the UE. In step 730 (which may be optional), the base station transmits to the UE the user data which was carried in the transmission that the host computer initiated, in accordance with the teachings of the embodiments described throughout this disclosure. In step 740 (which may also be optional), the UE executes a client application associated with the host application executed by the host computer.

Figure 8:
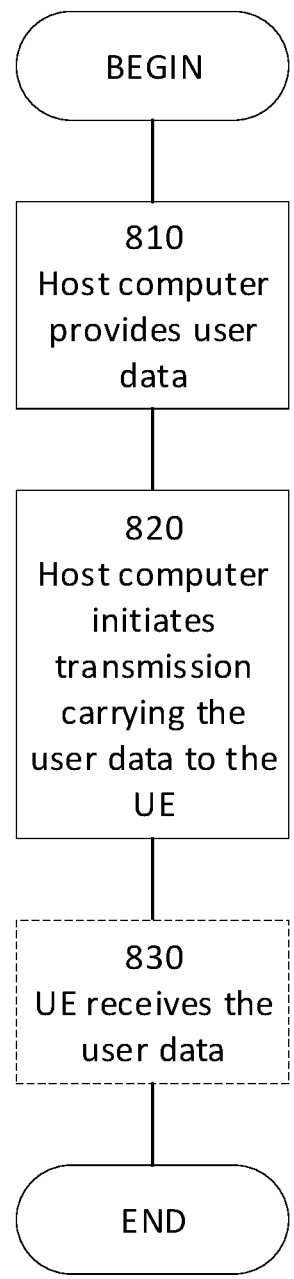
FIG. 8 illustrates another example method implemented in a communication system including a host computer, a base station and a user equipment, according to certain embodiments.

FIG. 8 illustrates an example method implemented in a communication system including a host computer, a base station and a user equipment, in accordance with some embodiments. More specifically, FIG. 8 is a flowchart illustrating a method implemented in a communication system, in accordance with one embodiment. The communication system includes a host computer, a base station which may be a network node described with reference to FIG. 13, and a UE. For simplicity of the present disclosure, only drawing references to FIG. 8 will be included in this section. In step 810 of the method, the host computer provides user data. In an optional substep (not shown) the host computer provides the user data by executing a host application. In step 820, the host computer initiates a transmission carrying the user data to the UE. The transmission may pass via the base station, in accordance with the teachings of the embodiments described throughout this disclosure. In step 830 (which may be optional), the UE receives the user data carried in the transmission.

Figure 9:
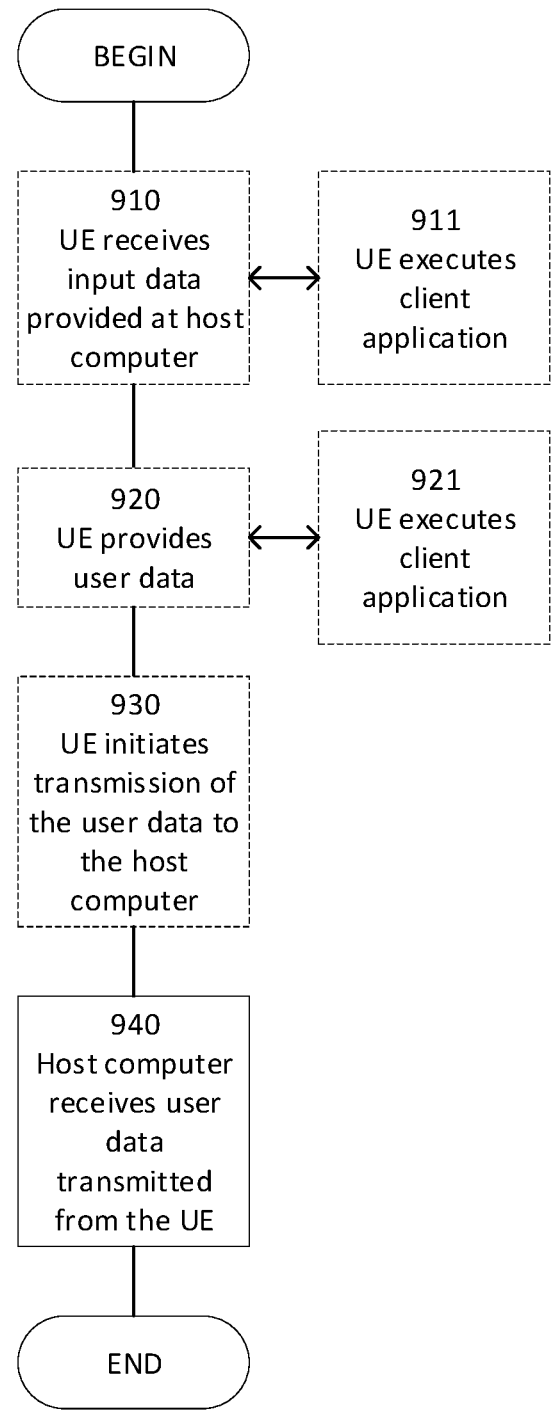
FIG. 9 illustrates another further example method implemented in a communication system including a host computer, a base station and a user equipment, according to certain embodiments.

FIG. 9 illustrates another further example method implemented in a communication system including a host computer, a base station and a user equipment, in accordance with some embodiments. More specifically, FIG. 9 is a flowchart illustrating a method implemented in a communication system, in accordance with one embodiment. The communication system includes a host computer, a base station which may be a network node described with reference to FIG. 13, and a UE. For simplicity of the present disclosure, only drawing references to FIG. 9 will be included in this section. In step 910 (which may be optional), the UE receives input data provided by the host computer. Additionally or alternatively, in step 920, the UE provides user data. In substep 921 (which may be optional) of step 920, the UE provides the user data by executing a client application. In substep 911 (which may be optional) of step 910, the UE executes a client application which provides the user data in reaction to the received input data provided by the host computer. In providing the user data, the executed client application may further consider user input received from the user. Regardless of the specific manner in which the user data was provided, the UE initiates, in substep 930 (which may be optional), transmission of the user data to the host computer. In step 940 of the method, the host computer receives the user data transmitted from the UE, in accordance with the teachings of the embodiments described throughout this disclosure.

Figure 10:
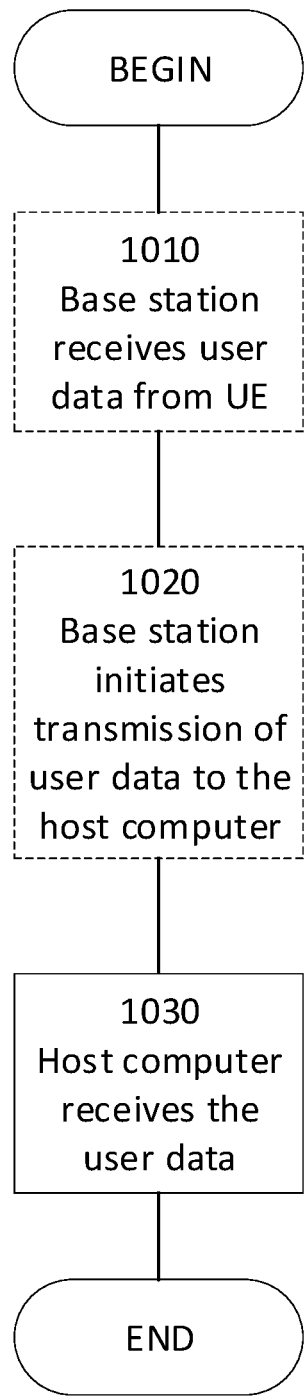
FIG. 10 illustrates another yet example method implemented in a communication system including a host computer, a base station and a user equipment, according to certain embodiments.

FIG. 10 illustrates another example method implemented in a communication system including a host computer, a base station and a user equipment, in accordance with some embodiments. More specifically, FIG. 10 is a flowchart illustrating a method implemented in a communication system, in accordance with one embodiment. The communication system includes a host computer, a base station which may be a network node described with reference to FIG. 13, and a UE. For simplicity of the present disclosure, only drawing references to FIG. 10 will be included in this section. In step 1010 (which may be optional), in accordance with the teachings of the embodiments described throughout this disclosure, the base station receives user data from the UE. In step 1020 (which may be optional), the base station initiates transmission of the received user data to the host computer. In step 1030 (which may be optional), the host computer receives the user data carried in the transmission initiated by the base station.

Figure 11:
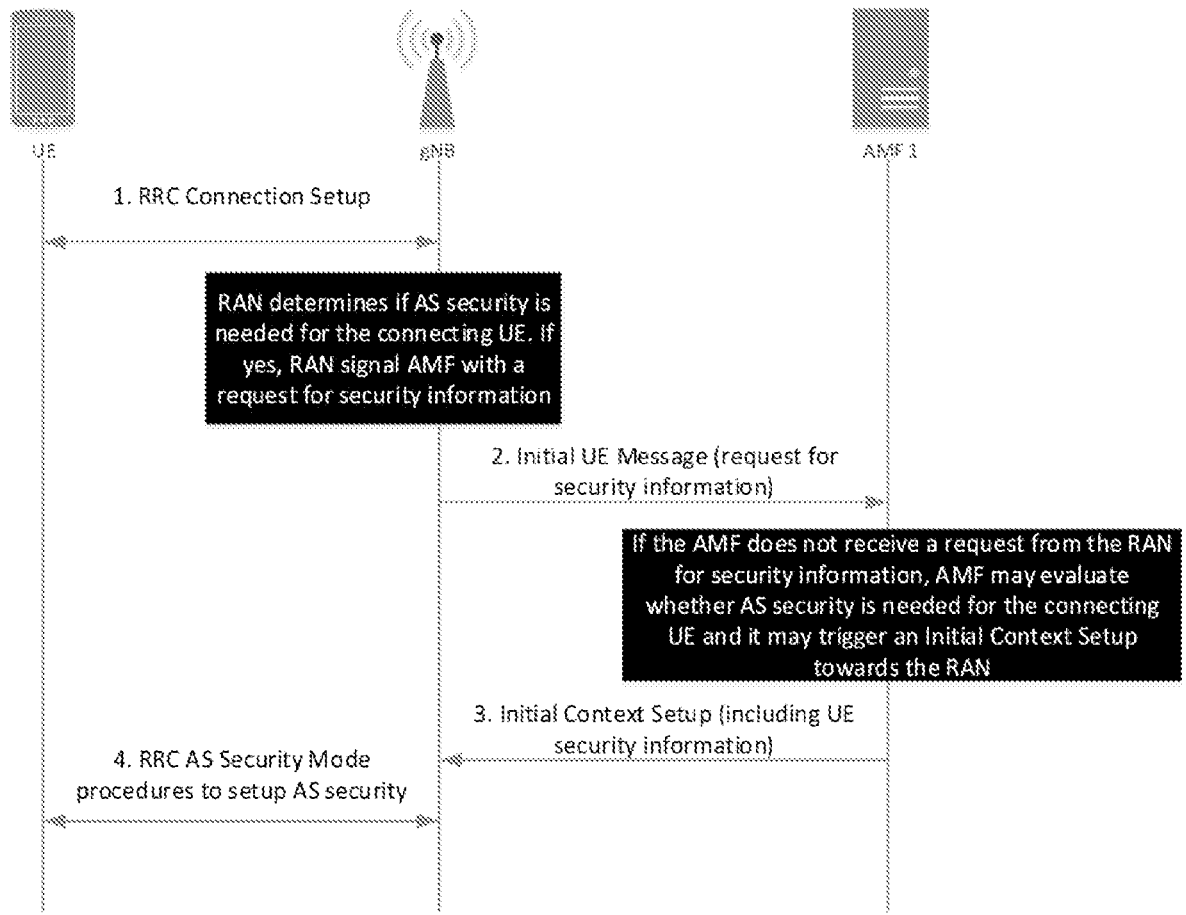
FIG. 11 illustrates an example interaction between a gNB and AMF to setup AS security for a UE, according to certain embodiments.

FIG. 11 illustrates an example of NG-RAN and AMF interaction to setup AS security for a UE, in accordance with some embodiments. At step 1, the UE connects to an NG-RAN node via RRC connection Setup procedures. In some embodiments, the NG-RAN node may be a gNB.

At step 2, the NG-RAN analyses the UE access. If the NG-RAN determines that AS security is needed, it may request security information from an AMF via a notification in an Initial UE Message. Such notification may be triggered, for example, if the RAN knows that reporting of logged minimization of drive test (MDT) statistics will be requested from the UE, or if the RAN knows that a redirection to other radio accesses is likely. In some embodiments, the Initial UE Message may include an information element (IE) to indicate that there is a need to request security information for the UE. In Table 1 below, it illustrates an example Initial UE Message which includes a new IE. Such IE is used to trigger the AMF to send an initial content setup or in general to trigger the AMF to signal security information to the NG-RAN node.

TABLE 1

Example Initial UE Message

| IE/Group Name | Presence | IE type and reference | Semantics description | Criticality | Assigned Criticality |
|---|---|---|---|---|---|
| Message Type | M | 9.3.1.1 | | YES | ignore |
| RAN UE NGAP ID | M | 9.3.3.2 | | YES | reject |
| NAS-PDU | M | 9.3.3.4 | | YES | reject |
| User Location Information | M | 9.3.1.16 | | YES | reject |
| RRC Establishment Cause | | <ref> | | YES | ignore |
| S-TMSI | O | <ref> | | YES | reject |
| GUAMI | O | <ref> | | YES | reject |
| AMF Group ID | O | <ref> | | YES | ignore |
| UE Context Request | O | Enumerated | This IE indicates that a UE context including security information needs to be setup at the NG-RAN | YES | ignore |

At step 3, if the AMF receives the notification from the NG-RAN indicating the need of security information, the AMF may start an Initial Context Setup procedure or equivalent procedures aimed at transferring UE security information to the NG-RAN. In some embodiments, the AMF may not receive an indication from the RAN, and in this case the AMF may still evaluate whether AS security is going to be needed for the UE in question. This may be, for example, due to Emergency Fallback procedures or the need of triggering UE radio capability fetching from the UE, which means that there is a need to trigger an NG-RAN node to retrieve the UE radio capability from the UE. In these specific events, the AMF may therefore still send an Initial Context Setup procedure or equivalent procedures aimed at transferring UE security information to the NG-RAN. In some embodiments, AMF may be referred to a functional module in a core network. AMF receives all connection and session related information from the UE and RAN via N1 and N2 interfaces. AMF is responsible for handling connection and mobility management tasks.

At step 4, upon a reception of security information for UE, the RAN may setup AS security with the UE via RRC AS Security Mode procedures. The RAN may decide not to setup AS security if, for example, the events that triggered the RAN to request security information from the AMF do not pertain anymore. For example, the RAN decides not to request the UE to report logged MDT measurements.

Figure 12:
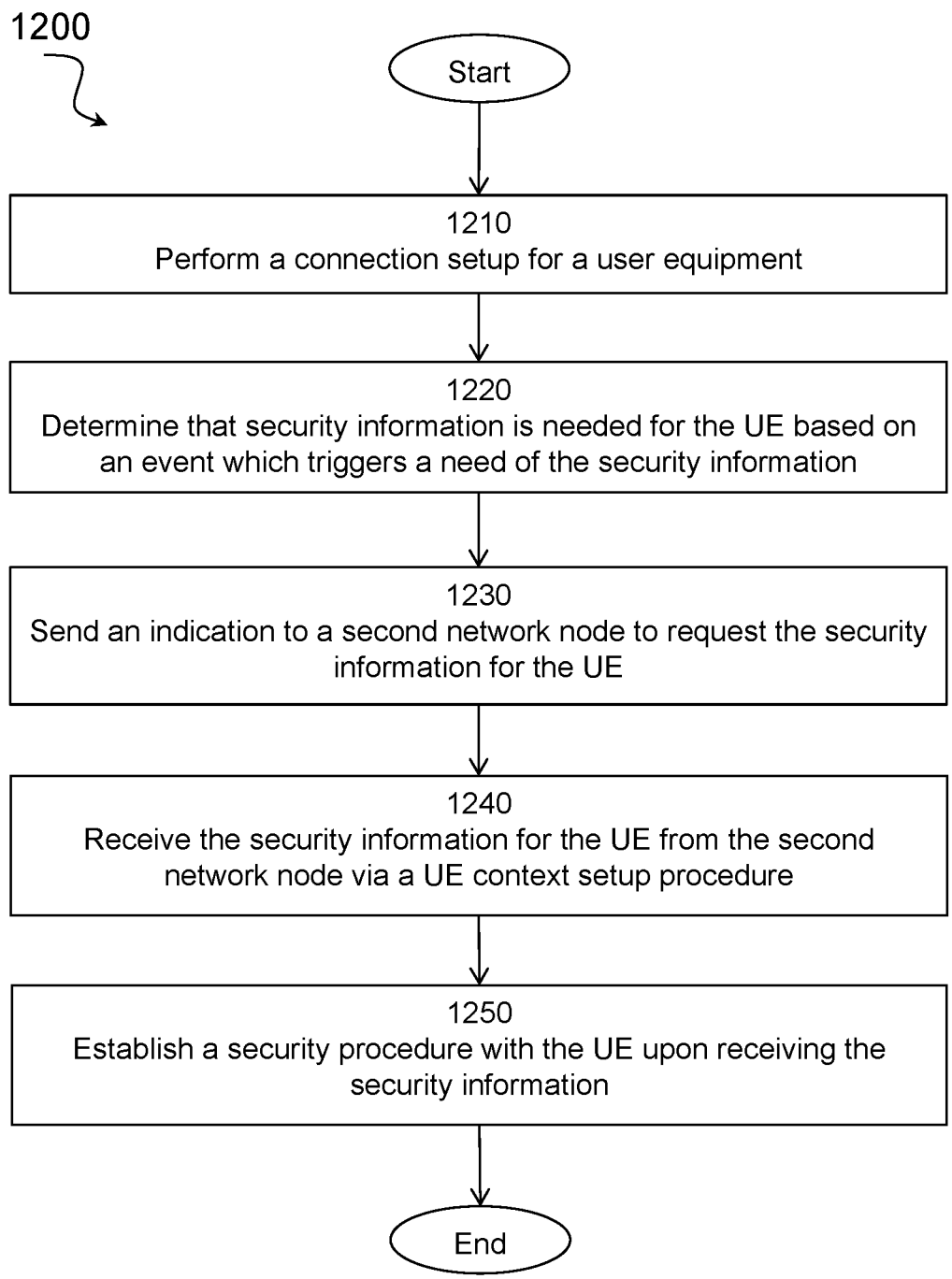
FIG. 12 illustrates a flow diagram of an example method, in accordance with certain embodiments.

FIG. 12 is a flow diagram of an example method, in accordance with certain embodiments. The method may be performed by a network node. The network node may be the network node depicted in FIG. 2. Method 1200 begins at step 1210 with performing a connection setup with a UE. In some embodiments, the connection setup may be an RRC connection setup.

At step 1220, the method 1200 determines that security information is needed for the UE based on an event which triggers a need of the security information. In some embodiments, the event may be a need to establish a secure connection with the UE on AS security. In some embodiments, the event may be that a report of logged MDT statistics will be requested from the UE. In some embodiments, the event may be that a redirection of the UE to another radio access network is likely.

At step 1230, the method 1200 sends an indication to a network node to request the security information for the UE. In some embodiments, the method 1200 may include an IE indicating that the security information is needed for the UE in the security request message, and send the security request message to the network node. In some embodiments, the network node may be a management function node of a core network. In some embodiments, the network node may be an AMF node to a core network.

At step 1240, the method 1200 receives the security information for the UE from the network node via a UE context setup procedure. In some embodiments, the network node may provide the security information without the indication sent in step 1230. In some embodiments, the security information may be provided based on a determination at the network node that AS security is going to be needed for the UE. In one embodiment, the AS security may be needed due to an emergency fallback procedure. In another embodiment, the AS security may be needed based on a need to trigger a retrieval of UE radio capability from the UE.

At step 1250, the method 1200 establishes a security procedure with the UE upon receiving the security information. In some embodiments, the method 1200 may set up AS security based on the received security information.

In another embodiment, after step 1240, the method 1200 may perform a determination again to see whether the event which triggers the need of the security information still exists, upon receiving the security information. If the event longer exists upon receiving the security information, the method 1200 may continue the connection setup with the UE without setting up AS security.

Figure 13:
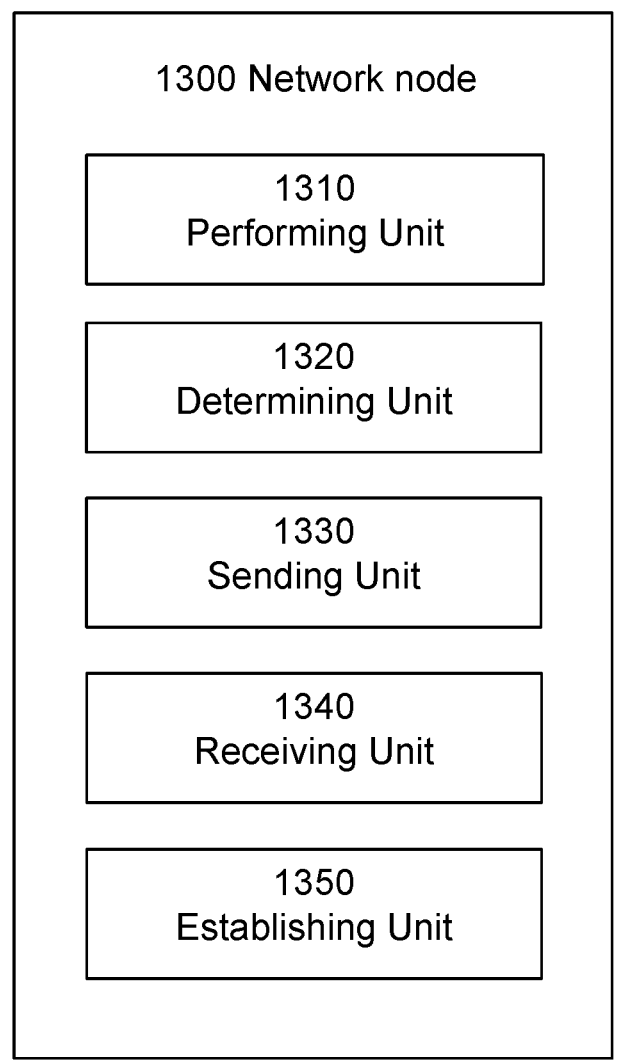
FIG. 13 illustrates a block schematic of an example network node, in accordance with certain embodiments.

FIG. 13 is a schematic block diagram of an exemplary network node 1300 in a wireless network, in accordance with certain embodiments. In some embodiments, the wireless network may be the wireless network 260 shown in FIG. 2. The network node may be implemented in a wireless device (e.g., wireless device 210 shown in FIG. 2). The network node 1300 is operable to carry out the example method described with reference to FIG. 12 and possibly any other processes or methods disclosed herein. It is also to be understood that the method of FIG. 12 is not necessarily carried out solely by the network node 1300. At least some operations of the method can be performed by one or more other entities.

Network node 1300 may comprise processing circuitry, which may include one or more microprocessor or microcontrollers, as well as other digital hardware, which may include digital signal processors (DSPs), special-purpose digital logic, and the like. In some embodiments, the processing circuitry of the network node 1300 may be the processing circuitry 270 shown in FIG. 2. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause performing unit 1310, determining unit 1320, sending unit 1330, receiving unit 1340, and establishing unit 1350, and any other suitable units of network node 1300 to perform corresponding functions according one or more embodiments of the present disclosure, such as a processor, a receiver, and a transmitter.

As illustrated in FIG. 13, the network node 1300 includes the performing unit 1310, the determining unit 1320, the sending unit 1330, the receiving unit 1340, and the establishing unit 1350. The performing unit 1310 may perform a connection setup with a UE. In some embodiments, the connection setup may be an RRC connection setup.

The determining unit 1320 may determine that security information is needed for the UE based on an event which triggers a need of the security information. In some embodiments, the event may be a need to establish a secure connection with the UE on AS security. In some embodiments, the event may be that a report of logged MDT statistics will be requested from the UE. In some embodiments, the event may be that a redirection of the UE to another radio access network is likely.

The sending unit 1330 may send an indication to a second network node to request the security information for the UE. In some embodiments, the sending unit 1330 may include an IE indicating that a UE context including the security information needs to be setup in an Initial UE message, and send the Initial UE message to the second network node. In some embodiments, the network 1300 may be a NG-RAN node. In some embodiments, the network node 1300 may be a gNB. In some embodiments, the second network node may be a management function node of a core network. In some embodiments, the second network node may be an AMF node to a core network.

The receiving unit 1340 may receive the security information for the UE from the second network node via a UE context setup procedure. In some embodiments, the second network node may provide the security information without the indication sent in step 1230. In some embodiments, the security information may be provided based on a determination at the second network node that AS security is going to be needed for the UE. In one embodiment, the AS security may be needed due to an emergency fallback procedure. In another embodiment, the AS security may be needed based on a need to trigger a retrieval of UE radio capability from the UE.

The establishing unit 1350 may establish a security procedure with the UE upon receiving the security information. In some embodiments, the establishing unit 1350 may set up AS security based on the received security information.

In another embodiment, the determining unit 1320 may perform a determination again to see whether the event which triggers the need of the security information still exists, upon receiving the security information. If the event no longer exists upon receiving the security information, the performing unit 1310 may continue the connection setup with the UE without setting up AS security.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

According to various embodiments, an advantage of features herein is utilizing an indication sending from RAN to a core network, so that all of the network nodes in RAN and CN may recognize the need of security information for a UE, and further may perform under a logic operation without extra signaling. Furthermore, since both of the network nodes in RAN and CN may perform a determination of the need of security information before setting up a full UE context, a significant resource waste in network may be reduced. Therefore, the efficiency and performance of network is improved.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for securing radio connections, comprising:
performing a connection setup with a user equipment (UE) to configure a connection that does not already have a secure connection established;
prior to securing the connection, determining that security information is needed for the UE based on an event which triggers a need of the security information;
sending an indication to a network node to request the security information for the UE; and
receiving the security information from the network node via a UE context setup procedure.

2. The method according to claim 1, further comprising:
establishing a security procedure with the UE upon receiving the security information; and
setting up access stratum (AS) security based on the received security information.

3. The method according to claim 1, further comprising:
determining that the event which triggers the need of the security information no longer exists upon receiving the security information; and
continuing the connection setup with the UE without setting up access stratum (AS) security.

4. The method according to claim 1, wherein the event is a need to establish a secure connection with the UE on AS security.

5. The method according to claim 1, wherein the event is that a report of logged minimization of drive test (MDT) statistics will be requested from the UE.

6. The method according to claim 1, wherein the event is that a redirection of the UE to another radio access network is likely.

7. The method according to claim 1, wherein sending the indication to the network node to request the security information for the UE comprises:
including an information element (IE) indicating that a UE context including the security information needs to be setup in an Initial UE message; and
sending the Initial UE message to the network node.

8. The method according to claim 1, wherein the security information is provided by the network node without the indication.

9. The method according to claim 8, wherein the security information is provided based on a determination at the network node that access stratum (AS) security is going to be needed for the UE.

10. The method according to claim 9, wherein the AS security is needed due to an emergency fallback procedure.

11. The method according to claim 9, wherein the AS security is needed based on a need to trigger a retrieval of UE radio capability from the UE.

12. The method according to claim 1, wherein the network node is an Access and Mobility Management Function (AMF) node of a core network.

13. A network node for securing radio connections, comprising:
at least one processing circuitry; and
at least one storage that stores processor-executable instructions, when executed by the processing circuitry, causes the network node to:
perform a connection setup with a user equipment (UE) to configure a connection that does not already have a secure connection established;
prior to securing the connection, determine that security information is needed for the UE based on an event which triggers a need of the security information;
send an indication to a second network node to request the security information for the UE; and
receive the security information from the second network node via a UE context setup procedure.

14. The network node according to claim 13,
wherein the instructions further cause the network node to:
establish a security procedure with the UE upon receiving the security information; and
set up access stratum (AS) security based on the received security information.

15. The network node according to claim 13, wherein the instructions further cause the network node to:
determine that the event which triggers the need of the security information no longer exists upon receiving the security information; and
continue the connection setup with the UE without setting up access stratum (AS) security.

16. The network node according to claim 13, wherein the event is a need to establish a secure connection with the UE on AS security.

17. The network node according to claim 13, wherein the event is that a report of logged minimization of drive test (MDT) statistics will be requested from the UE.

18. The network node according to claim 13, wherein the event is that a redirection of the UE to another radio access network is likely.

19. The network node according to claim 13, wherein the network node sending the indication to the second network node to request the security information for the UE comprises:
including an information element (IE) indicating that a UE context including the security information needs to be setup in an Initial UE message; and
sending the Initial UE message to the second network node.

20. The network node according to claim 13, wherein the security information is provided by the second network node without the indication.

21. The network node according to claim 20, wherein the security information is provided based on a determination at the second network node that access stratum (AS) security is going to be needed for the UE.

22. The network node according to claim 21, wherein the AS security is needed due to an emergency fallback procedure.

23. The network node according to claim 21, wherein the AS security is needed based on a need to trigger a retrieval of UE radio capability from the UE.

24. The network node according to claim 13, wherein the network node is a Next Generation Radio Access Network (NG-RAN) node, and the second network node is an Access and Mobility Management Function (AMF) node of a core network.

25. A communication system for securing radio connections, comprising at least one network node and at least one user equipment:
a first network node comprising at least one processing circuitry configured to:
perform a connection setup with a user equipment (UE) to configure a connection that does not already have a secure connection established;
prior to securing the connection, determine that security information is needed for the UE based on an event which triggers a need of the security information; and
send an indication to a second network node to request the security information for the UE; and
the second network node configured to:
receive the indication from the first network node;
determine whether the security information is going to be needed for the UE; and
send the security information to the first network node based on the determination via a UE context setup procedure; and
the first network node further configured to:
receive the security information from the second network node; and
establish a security procedure with the UE based on the security information.

\* \* \* \* \*